(12) United States Patent
Dufour

(10) Patent No.: US 11,534,842 B2
(45) Date of Patent: Dec. 27, 2022

(54) CUTTING INSERT AND CUTTING SYSTEM COMPRISING CUTTING INSERT

(71) Applicant: KENNAMETAL INC., Latrobe, PA (US)

(72) Inventor: Jean Luc Dufour, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 74 days.

(21) Appl. No.: 16/672,447

(22) Filed: Nov. 2, 2019

(65) Prior Publication Data

US 2021/0129239 A1  May 6, 2021

(51) Int. Cl.
*B23C 5/22* (2006.01)
*B23C 5/20* (2006.01)

(52) U.S. Cl.
CPC ............ *B23C 5/2221* (2013.01); *B23C 5/202* (2013.01); *B23C 5/22* (2013.01); *B23C 5/2204* (2013.01); *B23C 2210/165* (2013.01)

(58) Field of Classification Search
CPC ....... B23C 5/2204; B23C 5/222; B23C 5/202; B23C 2200/045; B23C 2210/16; B23C 2210/161; B23C 2210/165; B23C 2240/24
See application file for complete search history.

(56) References Cited

U.S. PATENT DOCUMENTS

| 6,050,751 | A |  | 4/2000 | Hellstrom | |
| 6,155,754 | A | * | 12/2000 | Jonsson | B23B 27/1622 407/103 |
| 6,238,133 | B1 |  | 5/2001 | DeRoche et al. | |
| 6,579,042 | B1 | * | 6/2003 | Shiraiwa | B23B 27/1614 407/35 |
| 7,168,895 | B2 |  | 1/2007 | Koskinen et al. | |
| 7,677,842 | B2 | * | 3/2010 | Park | B23B 27/1662 407/113 |
| 8,573,903 | B2 |  | 11/2013 | Morrison et al. | |
| 2003/0059262 | A1 | * | 3/2003 | Men | B23C 5/2221 407/35 |
| 2006/0245837 | A1 |  | 11/2006 | Dufour et al. | |
| 2006/0269374 | A1 |  | 11/2006 | Dufour et al. | |
| 2008/0181731 | A1 | * | 7/2008 | Wallstrom | B23C 5/2213 407/116 |
| 2008/0193233 | A1 | * | 8/2008 | Park | B23B 27/1662 407/104 |
| 2011/0268512 | A1 | * | 11/2011 | Jansson | B23C 5/2208 407/40 |
| 2016/0288215 | A1 | * | 10/2016 | Harif | B22F 3/16 |

FOREIGN PATENT DOCUMENTS

| CA | 2718584 A1 | * | 9/2009 | ........... B23C 5/2221 |
| JP | 2006263856 A | * | 10/2006 | |
| JP | 2014076505 A | * | 5/2014 | ........... B23C 5/2221 |

* cited by examiner

*Primary Examiner* — Nicole N Ramos
(74) *Attorney, Agent, or Firm* — Larry R. Meenan

(57) ABSTRACT

A cutting insert includes an upper surface having a circular cutting edge, a lower surface opposite the upper surface, an exterior sidewall between the upper surface and the lower surface, and an interior sidewall defining a hole extending from the upper surface to the lower surface. The interior sidewall includes an upper interior sidewall portion and a lower interior sidewall portion. The lower interior sidewall portion increases in radius with respect to a downward direction of the cutting insert. The lower interior sidewall portion includes a plurality of recessed portions positioned about a circumferential direction of the lower interior sidewall portion.

15 Claims, 6 Drawing Sheets

CUTTING INSERT AND CUTTING SYSTEM COMPRISING CUTTING INSERT

FIELD

The present description relates to cutting inserts and cutting tools comprising cutting inserts, and particularly cutting inserts with round cutting edges, in which the cutting inserts are configured for prevention of rotation.

BACKGROUND

Cutting inserts used in cutting tools such as milling cutters are typically mounted in complementary-shaped pockets spaced around a periphery of a tool body. The cutting inserts are typically secured within their respective pockets by screws inserted through a hole provided in the center of the cutting insert. During a cutting operation, such cutting inserts often experience not only compressive and vibratory forces, but some amount of torque due to the angle between the cutting edges of the cutting inserts and the workpiece. For cutting inserts of non-round shapes, such torque does not result in rotation of the cutting insert due to the interference-type fit between the angled sidewalls of such cutting inserts and the complementary-shaped walls of the pocket that receive them. By contrast, round cutting inserts can rotate within their respective pockets since no such mechanical interference naturally arises between the sidewalls of round cutting inserts and the circular walls of the pockets which receive them. The resulting rotation can reduce the life of the cutting insert and jeopardize the quality of the cut on the workpiece.

To prevent such unwanted rotation of round cutting inserts, several anti-rotation mechanisms have been developed previously. In one such mechanism, one or more lugs are provided on the pocket to retain the round cutting insert against rotation. However, during machining, a heavy feed tends to cause damage to or even remove the lug from the pocket, thus reducing the life of the cutting insert and ruining the tool holder.

Thus, there is a need for an anti-rotation mechanism for round cutting inserts which effectively prevents such cutting inserts from rotating without damaging the pocket that receives the cutting insert.

SUMMARY

In one embodiment, a cutting insert includes an upper surface having a circular cutting edge, a lower surface opposite the upper surface, an exterior sidewall between the upper surface and the lower surface, and an interior sidewall defining a hole extending from the upper surface to the lower surface. The interior sidewall includes an upper interior sidewall portion and a lower interior sidewall portion. The lower interior sidewall portion increases in radius with respect to a downward direction of the cutting insert. The lower interior sidewall portion includes a plurality of recessed portions positioned about a circumferential direction of the lower interior sidewall portion.

In another embodiment, a cutting tool includes a toolholder having a threaded bore therein, a cutting insert mounted on the toolholder, and a screw. The cutting insert includes an upper surface having a circular cutting edge, a lower surface opposite the upper surface, an exterior sidewall between the upper surface and the lower surface, and an interior sidewall defining a hole extending from the upper surface to the lower surface. The interior sidewall includes a plurality of raised portions positioned about a circumferential direction of the interior sidewall. The screw has a shaft extending through the hole of the cutting insert and screwed into the threaded bore of the toolholder. The shaft is configured to elastically deform radially outwardly to a position between adjacent raised portions of the plurality of raised portions.

In yet another embodiment, a method for operating a cutting tool includes inserting a shaft of a screw through a hole of a cutting insert and screwing the shaft into a threaded bore of a toolholder. The cutting insert includes an upper surface having a circular cutting edge. During a first cutting load, a head of the screw is frictionally engaged with an inner sidewall of the cutting insert to inhibit a rotation of the cutting insert. During a second cutting load greater than the first cutting load, the shaft is elastically deformed radially outwardly to a position at least partially disposed within a recess portions of the inner sidewall to inhibit rotation of the cutting insert.

Other embodiments of the disclosed cutting insert cutting tool and will become apparent from the following detailed description, the accompanying drawings and the appended claims.

DETAILED DESCRIPTION

Figure 1:
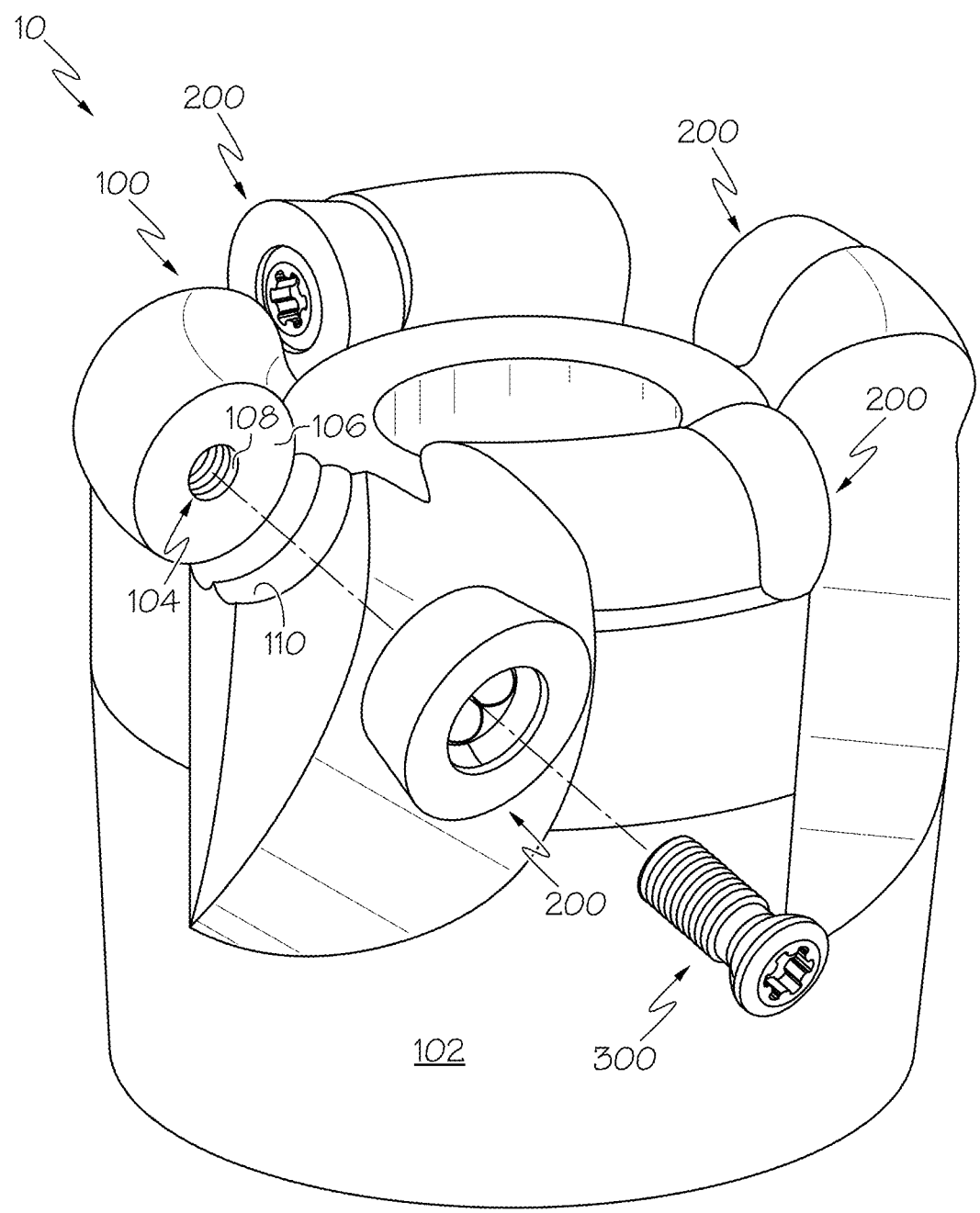
FIG. 1 is a perspective view of a cutting tool according an exemplary embodiment of the present description, including a cutting insert, a screw, and a pocket.
Figure 2:
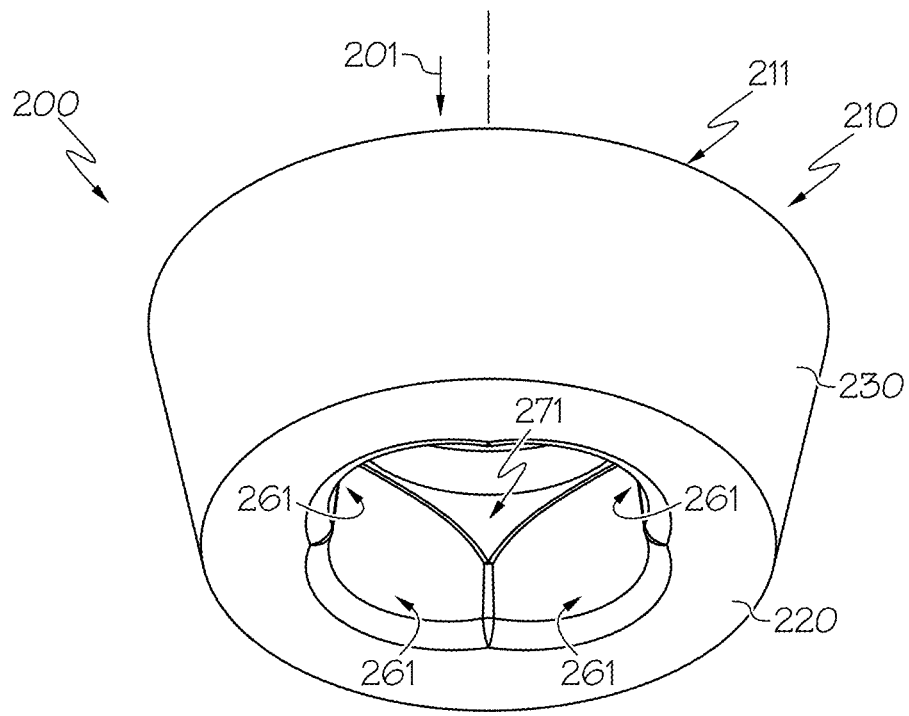
FIG. 2 is a lower perspective view of the cutting insert of FIG. 1 according an exemplary embodiment of the present description.
Figure 3:
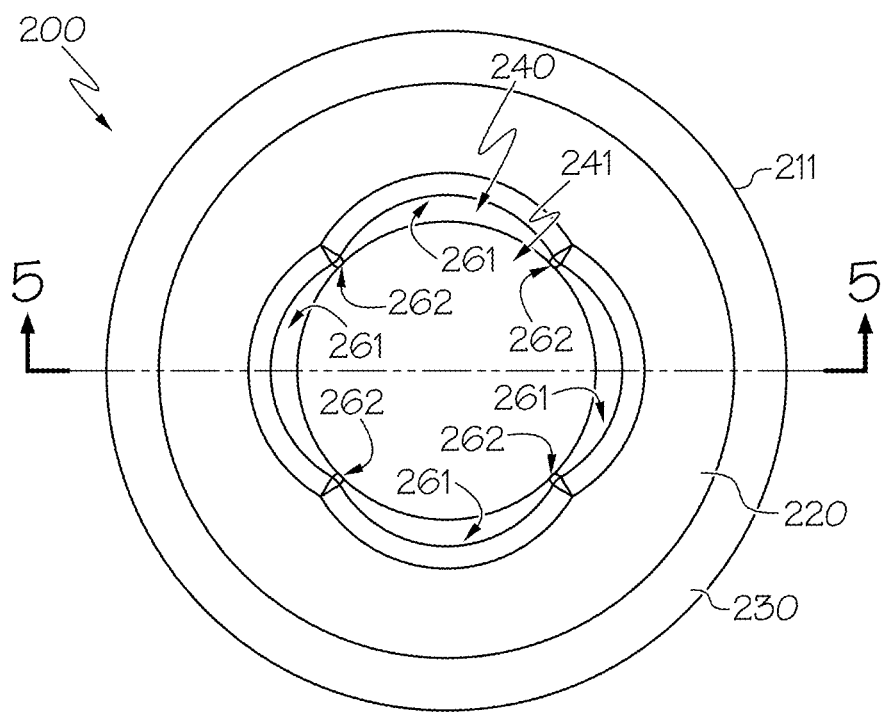
FIG. 3 is a top view of the cutting insert of FIG. 2, including sectional line 5-5.
Figure 4:
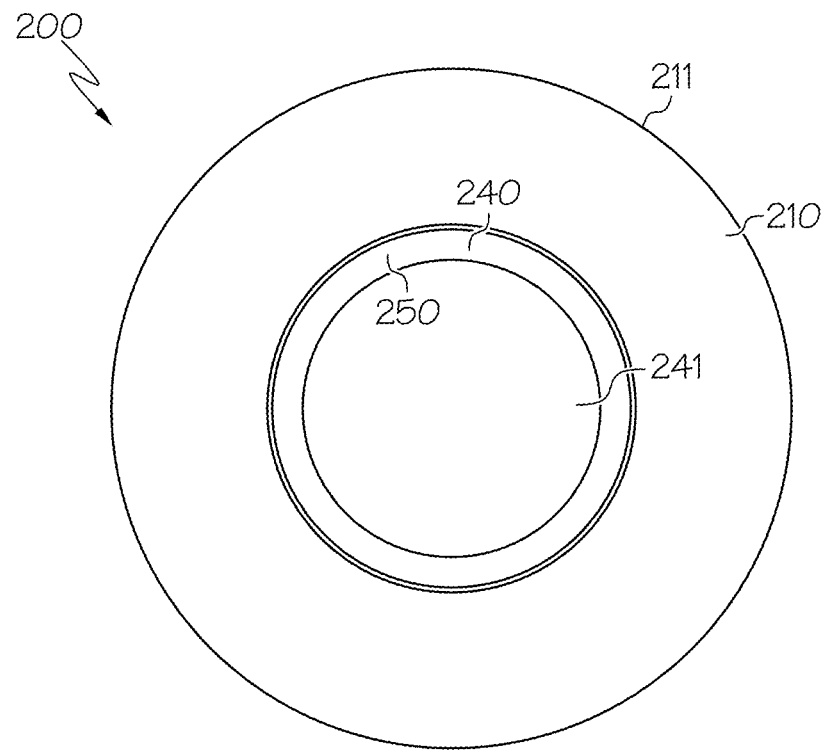
FIG. 4 is a bottom view of the cutting insert of FIG. 2, including sectional line 5-5.

FIG. 1 illustrates cutting tool 10 according an exemplary embodiment of the present description. The cutting tool 10 includes toolholder 100, cutting insert 200, and screw 300.

Referring to FIG. 1, the toolholder 100 illustrated therein is exemplary. It will be understood that the toolholder 100 of the present description can include any toolholder 100 capable of holding the cutting insert 200 of the present description.

Referring to FIG. 1, the toolholder 100 includes a toolholder body 102, a toolholder pocket 104, a pocket floor 106, and a threaded bore 108. The toolholder body 102 as illustrated has the shape of a toolholder body for a milling cutter but may have the shape of a toolholder body for any other cutting tool capable of holding the cutting insert 200 of the present description.

Referring to FIG. 1, the toolholder pocket 104 is formed into the toolholder body 102. The toolholder pocket 104 includes any structure configured for receiving the cutting insert 200 of the present description. In the illustrated embodiment, the toolholder pocket 104 includes a pocket floor 106 having a threaded bore 108 therein. The toolholder pocket 104 may further include pocket sidewall 110 for supporting a cutting insert 200 during a cutting operation.

FIGS. 2 to 5 illustrate a typical cutting insert 200 according to the present description in the form of a round cutting insert 200 capable of being mounted on the toolholder 100. The cutting insert 200 includes an upper surface 210 having a circular cutting edge 211, a lower surface 220 opposite the upper surface 210, an exterior sidewall 230 between the upper surface 210 and the lower surface 220, and an interior sidewall 240 defining a hole 241 extending from the upper surface 210 to the lower surface 220. When the cutting insert 200 is mounted onto the toolholder body 102 of the toolholder 100, the lower surface 220 of the cutting insert 200 engages with the pocket floor 106 of the toolholder 100, and the exterior sidewall 230 engages with the pocket sidewall 110 of the toolholder 100.

In the illustrated example, the upper surface 210 may typically have a planar shape terminating in the circular cutting edge 211 surrounding the upper surface 210. However, the shape of the upper surface 210 is not necessarily limited to the illustrated planar shape.

In the illustrated example, the lower surface 220 may have a shape that is complimentary to the shape of the pocket floor 106. Typically, the lower surface 220 has a planar shape that is complimentary to a planar shape of the pocket floor 106. However, the shape of the lower surface 220 is not necessarily limited to the illustrated planar shape.

As shown in the illustrated example, the radius of the upper surface 210 may be greater than a radius of the lower surface 220. Also, the exterior sidewall 230 may have a shape that is complimentary to the shape of the pocket sidewall 110, typically a frustoconical shape. However, the exterior sidewall 216 is not necessarily limited to the illustrated frustoconical shape.

The interior sidewall 240 defines hole 241 that is centrally disposed through the cutting insert 200. As will be described below, the shape of the interior sidewall 240 is chosen to prevent rotation of the cutting insert 200 within the pocket 104 by engagement of the interior sidewall 240 with the screw 300.

Figure 6:
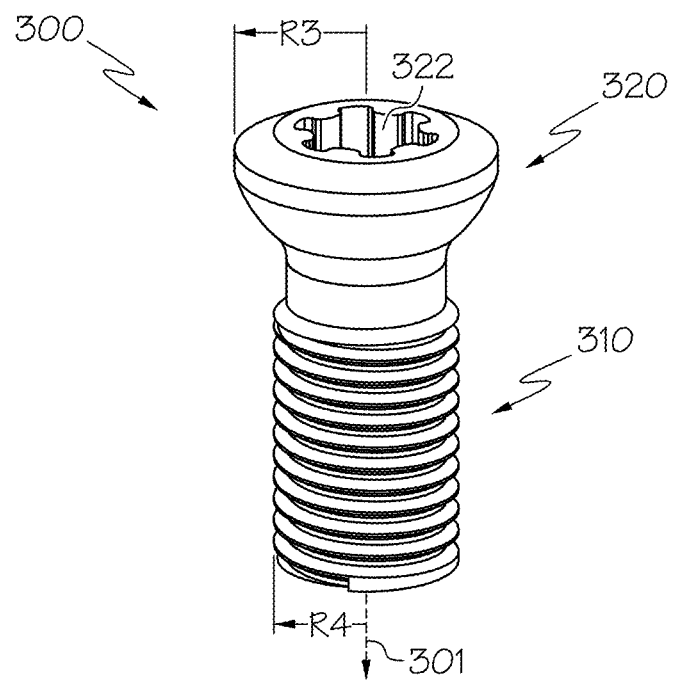
FIG. 6 is an upper perspective view of the screw of FIG. 1 according an exemplary embodiment of the present description.
Figure 7:
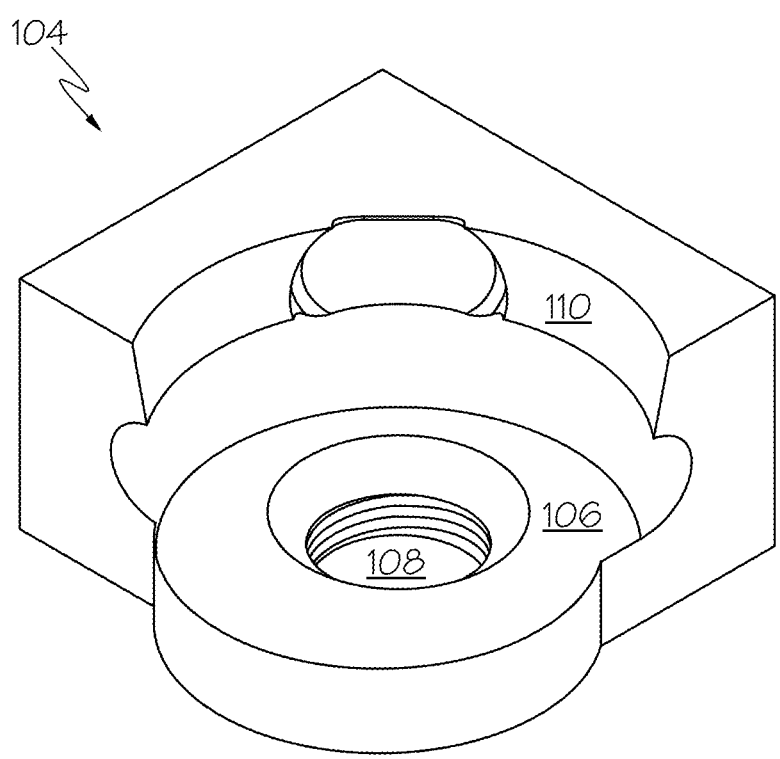
FIG. 7 is an upper perspective view of the pocket of FIG. 1 according an exemplary embodiment of the present description.
Figure 8:
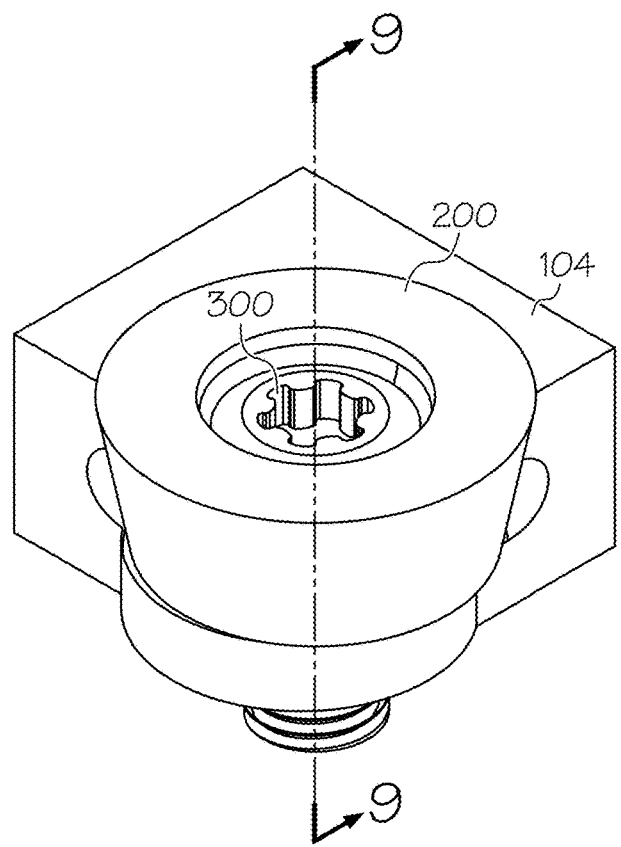
FIG. 8 is an upper perspective view of the cutting insert of FIG. 2, the screw of FIG. 6, and the pocket of FIG. 7, including sectional line 9-9.
Figure 9:
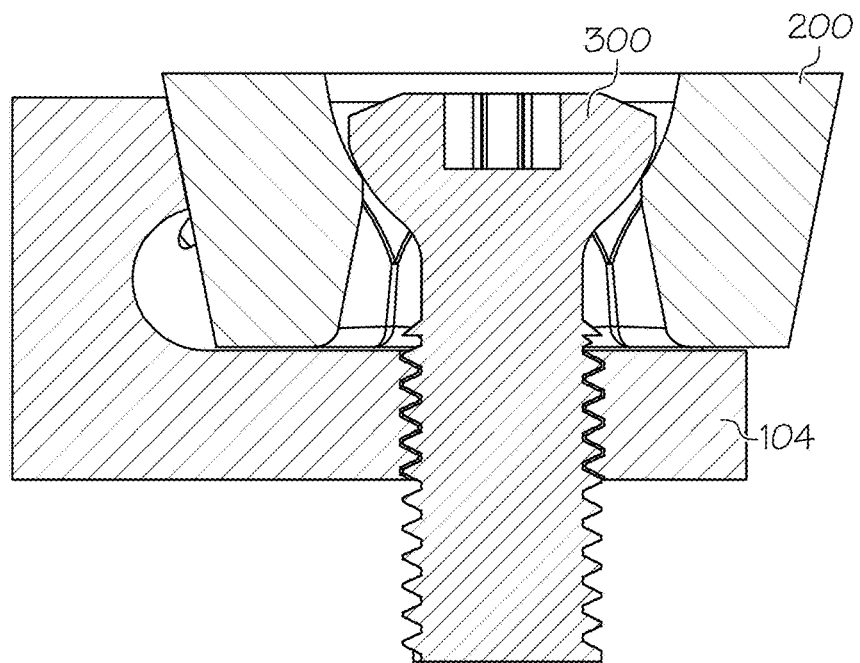
FIG. 9 is a sectional side view of the of the cutting insert of FIG. 2, the screw of FIG. 6, and the pocket of FIG. 7, shown as being sectioned along line 9-9.
Figure 10:
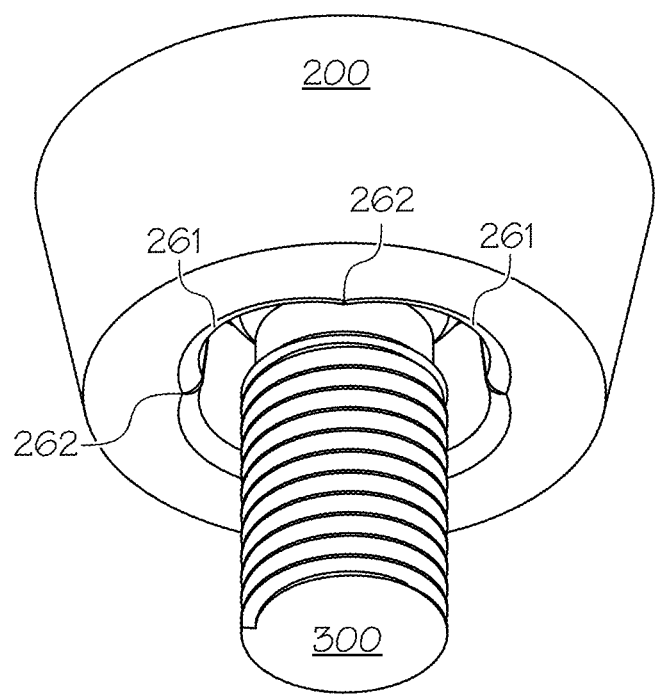
FIG. 10 is a lower perspective view of the cutting insert of FIG. 2 and the screw of FIG. 6, in a first configuration.

FIG. 6 illustrates a typical screw 300 according to the present description. The screw 300 includes a shaft 310 and a head 320. The shaft 310 has a length sufficient to extend through the hole 241 of the cutting insert 200 and into the threaded bore 108 of the toolholder 100. The head 320 has width sufficient to prevent passage of the head 320 through the hole 241. When the cutting insert 200 is mounted onto the toolholder body 102 of the toolholder 100, the screw 300 passes through the hole 241 from the upper surface 210 of the cutting insert 200 to the lower surface 220 cutting insert 200 and screws into the threaded bore 108 of the toolholder 100 to hold the cutting insert 200 within the toolholder pocket 104 of the toolholder 100. As illustrated in FIG. 6, the head 320 may include a wrench-receiving recess 322 to facilitate turning of the screw 300 within the threaded bore 108 of the toolholder 100 to hold the cutting insert 200 within the pocket 104 of the toolholder 100.

Returning to FIGS. 2 to 5, the interior sidewall 240 includes an upper interior sidewall portion 250 and a lower interior sidewall portion 260.

In an aspect, the upper interior sidewall portion 250 may have a maximum radius R1 that is less than a radius of the head 320 of the screw 300. Accordingly, the upper interior sidewall portion 250 may engage with the head 320 of the screw 300 to facilitate holding the cutting insert 200 within the pocket 104 of the toolholder 100.

In another aspect, the upper interior sidewall portion 250 may decrease in radius R1 with respect to the downward direction 201 of the cutting insert 200. Likewise, the head 320 of the screw 300 may decrease in radius R3 with respect to the downward direction 301 of the screw 300. Thus, the upper interior sidewall portion 250 and the head 320 of the screw 300 may form contact surfaces that increase a coefficient of friction between the upper interior sidewall portion 250 cutting insert 200 and the head 320 of the screw 300 to inhibit a rotation of the cutting insert 200.

Figure 5:
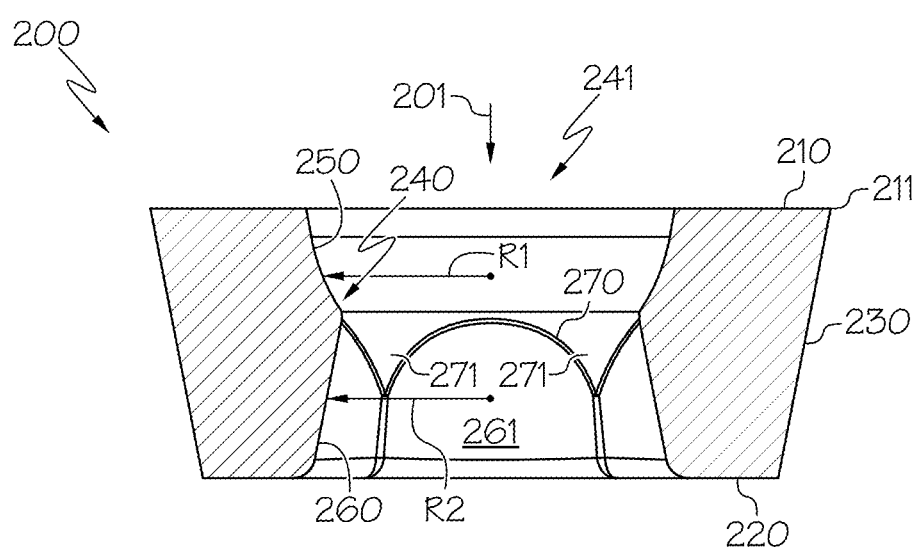
FIG. 5 is a sectional side view of the cutting insert of FIG. 2, shown as being sectioned along line 5-5.

In another aspect, a slope of the upper interior sidewall portion 250 may decrease with respect to the downward direction 201 of the cutting insert 200 as best shown in FIG. 5. Thus, in a vertical cross-section, the upper interior sidewall portion 250 may have a concave appearance. Likewise, a slope of the head 320 of the screw 300 may decrease with respect to the downward direction 301 of the screw 300. Thus, in a vertical cross-section, the head 320 of the screw 300 may have a convex appearance. The decreasing slopes of the upper interior sidewall portion 250 and the head 320 of the screw 300 were chosen to further increase the coefficient of friction between the upper interior sidewall portion 250 cutting insert 200 and the head 320 of the screw 300 to inhibit a rotation of the cutting insert 200.

In the illustrated example, the upper interior sidewall portion 250 and the head 320 of the screw 300 have a spherical shape as an optimum shape for increasing the coefficient of friction between the upper interior sidewall portion 250 cutting insert 200 and the head 320 of the screw 300 to inhibit a rotation of the cutting insert 200.

Thus, by maximizing the coefficient of friction between the upper interior sidewall portion 250 cutting insert 200 and the head 320 of the screw 300, prevention of rotation of the cutting insert 200 when the cutting insert 200 is subjected to light to medium cutting loads. At heavy loads, the frictional force between the upper interior sidewall portion 250 cutting insert 200 and the head 320 of the screw 300 will not be sufficient to prevent rotation of the cutting insert 200.

In an aspect, the screw 300 is configured to elastically deform radially outwardly under heavy cutting loads to engage with the lower interior sidewall portion 260 of the interior sidewall 240.

In an aspect, the lower interior sidewall portion 260 may increase in radius R2 with respect to a downward direction 201 of the cutting insert 200. Accordingly, in an unloaded state, the lower interior sidewall portion 260 does not interfere with the shaft 310 the screw 300. In a loaded state, the shaft 310 of the screw 300 may elastically deform radially outwardly to engage with the lower interior sidewall portion 260 having the increasing radius R2.

Figure 11:
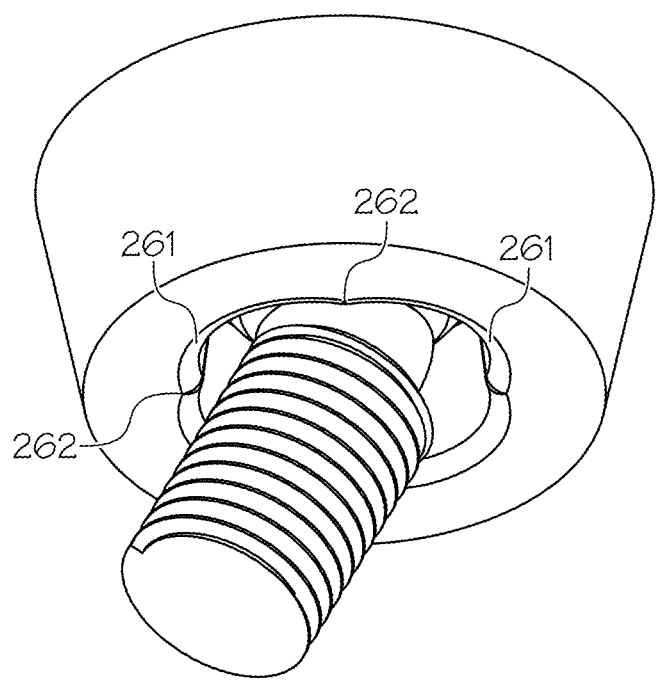
FIG. 11 is a lower perspective view of the cutting insert of FIG. 2 and the screw of FIG. 6, in a second configuration, in which the screw of FIG. 6 is bent.

In an aspect, the lower interior sidewall portion 260 includes a plurality of recessed portions 261 positioned about a circumferential direction 202 of the lower interior sidewall portion 260. As shown, the recessed portions 261 may be angled radially outwardly to accommodate the shaft 310 of the screw 300 with the shaft 310 is elastically deformed radially outwardly. Accordingly, in a loaded state, the shaft 310 of the screw 300 may elastically deform radially outwardly to be at least partially disposed within one of the recess portions 261. By the positioning the shaft 310 within one of the recess portions 261, rotation of the cutting insert 200 is inhibited. FIG. 11 represents an example in which the shaft 310 of the screw 300 is elastically deformed radially outwardly under heavy cutting loads to engage with the lower interior sidewall portion 260 of the interior sidewall 240 such that it is positioned within one of the recess portions 261.

In an aspect, the plurality of recessed portions 261 are uniformly positioned about a circumferential direction 202 of the lower interior sidewall portion 260. The uniform positioning of the plurality of recessed portions 261 supports an indexability of the cutting insert 200.

In an aspect, the number of recess portions 261 are between two and ten. In an example, the number of recess portions 261 are three. In another example, the number of recess portions 261 are four. In yet another example, the number of recess portions 261 are five. In yet another example, the number of recess portions 261 are six. In yet another example, the number of recess portions 261 are seven. In yet another example, the number of recess portions 261 are eight.

In an aspect, the recessed portions 261 may have a radius of curvature greater than a radius of radius R4 of the shaft 310. The radius of curvature of the recessed portions 261 is determined in a directly perpendicular to the vertical centerline of the recessed portions 261. By way of the recessed portions 261 having a radius of curvature greater than a radius of radius R4 of the shaft 310, the recessed portions 261 fit within the recessed portions 261.

In an aspect, the radius of curvature of the recess portions 261 corresponds with a radius R4 of radius of the shaft 310. Thus, in a loaded state, the shaft 310 of the screw 300 may frictionally engage with the recessed portions 261. In this regard, a radius of curvature of the recessed portions 261 may be between 100% to 150% of the radius R4 of the shaft 310, preferably within 100% to 130% of the radius R4 of the shaft 310, more preferably within 100% to 110% of the radius R4 of the shaft 310.

In an aspect, the lower interior sidewall portion 260 includes a plurality of raised portions 262 positioned about a circumferential direction 202 of the lower interior sidewall portion 260. Raised portions 262 may form the link between the recessed portions 261. Accordingly, in a loaded state, the shaft 310 of the screw 300 may elastically deform radially outwardly to be at least partially disposed between adjacent raised portions 262 of the plurality of raised portions 262. By the positioning the shaft 310 between adjacent raised portions 262, rotation of the cutting insert 200 is inhibited. FIG. 11 represents an example in which the shaft 310 of the screw 300 is elastically deformed radially outwardly under heavy cutting loads to engage with the lower interior sidewall portion 260 of the interior sidewall 240 such that it is positioned between adjacent raised portions 262.

In an aspect, the plurality of raised portions 262 are uniformly positioned about a circumferential direction 202 of the lower interior sidewall portion 260. The uniform positioning of the plurality of raised portions 262 supports an indexability of the cutting insert 200.

In an aspect, the number of raised portions 262 are between two and ten. In an example, the number of raised portions 262 are three. In another example, the number of raised portions 262 are four. In yet another example, the number of raised portions 262 are five. In yet another example, the number of raised portions 262 are six. In yet another example, the number of raised portions 262 are seven. In yet another example, the number of raised portions 262 are eight.

In an aspect, the plurality of raised portions 262 collectively define a radius that is greater than a radius R4 of the shaft 310. Thus, in an unloaded state, the shaft 310 may pass by the raised portions 262 and into the threaded bore 108 of the toolholder 100.

In an aspect, the plurality of raised portions 262 collectively define a radius that corresponds with a radius of radius R4 of the shaft 310. Thus, in an unloaded state, plurality of raised portions 262 facilitate a guiding of the shaft 310 to the threaded bore 108. In this regard, the radius defined by the plurality of raised portions 262 collectively may be between 100% to 150% of the radius R4 of the shaft 310, preferably within 100% to 130% of the radius R4 of the shaft 310, more preferably within 100% to 110% of the radius R4 of the shaft 310.

Under heavy cutting loads, the above-described engagement of the shaft 310 of the screw 300 with the lower interior sidewall portion 260 prevents rotation of the cutting insert 200.

In an aspect, the interior sidewall 240 may further include a sidewall guide portion 270 positioned around the hole 241 between the upper interior sidewall portion 250 and the lower interior sidewall portion 260. The sidewall guide portion 270 may facilitate a guiding of the shaft of the screw through the hole 241 of the cutting insert 200 and into the threaded bore 108 of the toolholder 100. Thus, the cutting insert 200 and the screw 300 may find their own way during the installation to the cutting insert 200 into the pocket 104. Accordingly, it is not necessary to add a feature to the cutting tool 10 to help the operator during the installation of the cutting insert 200 into the pocket 104

In an aspect, the sidewall guide portion 270 may include plurality of downwardly extending sidewall capes 271. The plurality of downwardly extending sidewall capes 271 further facilitate a guiding of the shaft of the screw through the hole 241 of the cutting insert 200 and into the threaded bore 108 of the toolholder 100.

In an aspect, each sidewall cape 271 may be positioned circumferentially between adjacent recessed portions 261 and may end at the plurality of raised portions 262.

In an aspect, the plurality of downwardly extending sidewall capes 271 may collectively define a radius that is greater than a radius R4 of the shaft 310. Thus, in an unloaded state, the shaft 310 may pass by the plurality of downwardly extending sidewall capes 271 and into the threaded bore 108 of the toolholder 100.

In an aspect, the plurality of downwardly extending sidewall capes 271 collectively define a radius that corresponds with a radius of radius R4 of the shaft 310. Thus, in an unloaded state, the plurality of downwardly extending sidewall capes 271 facilitate a guiding of the shaft 310 to the threaded bore 108. In this regard, the radius defined by the plurality of downwardly extending sidewall capes 271 collectively may be between 100% to 150% of the radius R4 of the shaft 310, preferably within 100% to 130% of the radius R4 of the shaft 310, more preferably within 100% to 110% of the radius R4 of the shaft 310.

In an aspect, a radius of the sidewall guide portion 270 is greater than a radius R4 of the shaft 310. Thus, in an unloaded state, the shaft 310 may pass by the sidewall guide portion 270 and into the threaded bore 108 of the toolholder 100.

In an aspect, a radius of the sidewall guide portion 270 corresponds with a radius of radius R4 of the shaft 310. Thus, the sidewall guide portion 270 facilitate a guiding of the shaft 310 through the hole 241 of the cutting insert 200. In this regard, the radius of the sidewall guide portion 270 may be between 100% to 150% of the radius R4 of the shaft 310, preferably within 100% to 130% of the radius R4 of the shaft 310, more preferably within 100% to 110% of the radius R4 of the shaft 310.

Thus, as described above, the cutting insert 200 may include recessed portions 261, raised portions 262, the sidewall guide portion 270, and the downwardly extending sidewall capes 271 that define radii that correspond to radius R4 of the shaft 310, such that the radius of each of these features is may be between 100% to 150% of the radius R4 of the shaft 310, preferably within 100% to 130% of the radius R4 of the shaft 310, more preferably within 100% to 110% of the radius R4 of the shaft 310.

Thus, there may be a correspondence between each of features such that, in an aspect, the radius of the recess portions 261 may correspond to the radius collectively defined by the raised portions 262. Likewise, the radius of the recess portions 261 may correspond to the radius of the sidewall guide portion 270. Likewise, the radius of the recess portions 261 may correspond to the radius collectively defined by the downwardly extending sidewall capes 271. Likewise, the radius collectively defined by the raised portions 262 may correspond to the radius of the sidewall guide portion 270. Likewise, the radius collectively defined by the raised portions 262 may correspond to the radius collectively defined by the downwardly extending sidewall capes 271. Likewise, the radius of the sidewall guide portion 270 may correspond to the radius collectively defined by the downwardly extending sidewall capes 271. In this regard, the correspondence between the radius of any two of these features is preferably determined such the larger radius is 100% to 150% of the radius of the smaller radius.

In another aspect, there is a method for operating a cutting tool includes inserting a shaft 310 of a screw 300 through a hole 241 of a cutting insert 200 and screwing the shaft 310 into a threaded bore 108 of a toolholder 100. The cutting insert 200 includes an upper surface 210 having a circular cutting edge 211. During a first cutting load, a head 320 of the screw 300 is frictionally engaged with an inner sidewall 240 of the cutting insert 200 to inhibit a rotation of the cutting insert 200. During a second cutting load greater than the first cutting load, the shaft 310 is elastically deformed radially outwardly to a position at least partially disposed within a recess portions 261 of the inner sidewall 240 to inhibit rotation of the cutting insert 200. The terms first cutting load and second cutting load are relative terms to indicate that the second cutting load is greater than the first cutting load. The first cutting load may be a light cutting load, and the second may be a heavy cutting load. By way of the method of the present application, there may be two modes of inhibiting rotation of the cutting insert 200. When the cutting load becomes too much for the frictional force to counteract, then the second mode of inhibiting rotation of the cutting insert 200 activates, and the shaft 310 is elastically deformed radially outwardly to a position at least partially disposed within a recess portions 261 of the inner sidewall 240 to inhibit rotation of the cutting insert 200.

Although various embodiments of the disclosed cutting inserts and cutting tools comprising cutting inserts have been shown and described, modifications may occur to those skilled in the art upon reading the specification. The present application includes such modifications and is limited only by the scope of the claims.

What is claimed is:

1. A cutting insert comprising:
an upper surface having a circular cutting edge;
a lower surface opposite the upper surface;
an exterior sidewall between the upper surface and the lower surface; and
an interior sidewall defining a hole extending from the upper surface to the lower surface, wherein the interior sidewall includes an upper interior sidewall portion and a lower interior sidewall portion, the cutting insert having a central axis defining an axially upward direction towards the upper surface of the cutting insert, an axially downward direction towards the lower surface of the cutting insert, a radially outward direction towards the exterior sidewall of the cutting insert, a radially inward direction towards the central axis of the cutting insert, and a circumferential direction extending circumferentially about the central axis,
wherein the lower interior sidewall portion includes a plurality of circumferentially offset and radially inwardly raised portions and a plurality of circumferentially offset and radially outwardly recessed portions, each radially outwardly recessed portion of the plurality of circumferentially offset and radially outwardly recessed portions being defined by a radially outwardly recessed interior surface between adjacent raised portions of the plurality of circumferentially offset and radially inwardly raised portions, and
wherein, in a vertical cross-section of the cutting insert along the central axis thereof, a distance between the upper interior sidewall portion and the central axis decreases with respect to the axially downward direction of the cutting insert and a distance between the radially outwardly recessed interior surfaces and the central axis increases with respect to the axially downward direction of the cutting insert, and
wherein, in a bottom view of the cutting insert, all of the radially outwardly recessed interior surfaces of the plurality of circumferentially offset and radially outwardly recessed portions are visible.

2. The cutting insert of claim 1, wherein a radius of the upper surface is greater than a radius of the lower surface.

3. The cutting insert of claim 2, wherein the exterior sidewall has a frustoconical shape.

4. The cutting insert of claim 1, wherein, in the vertical cross-section of the cutting insert, the upper interior sidewall portion is concave.

5. The cutting insert of claim 1, wherein the interior sidewall includes a sidewall guide portion between the upper interior sidewall portion and the lower interior sidewall portion.

6. The cutting insert of claim 5, wherein the sidewall guide portion includes a plurality of axially downwardly-extending sidewall capes, each sidewall cape being positioned between adjacent radially outwardly recessed portions with respect to the circumferential direction of the cutting insert.

7. The cutting insert of claim 6, wherein the plurality of downwardly-extending sidewall capes collectively define a radius, and wherein the radius of the plurality of downwardly-extending sidewall capes corresponds to a radius of curvature of each recessed portion of the plurality of recessed portions such that the larger of the radius of the plurality of downwardly-extending sidewall capes and each recessed portion is 100% to 150% of the radius of the other of the plurality of downwardly-extending sidewall capes and each recessed portion.

8. A cutting tool comprising:
a toolholder having a threaded bore therein;
a cutting insert mounted on the toolholder, the cutting insert comprising:
an upper surface having a circular cutting edge;
a lower surface opposite the upper surface;
an exterior sidewall between the upper surface and the lower surface; and
an interior sidewall defining a hole extending from the upper surface to the lower surface, wherein the interior sidewall includes an upper interior sidewall portion and a lower interior sidewall portion, the cutting insert having a central axis defining an axially upward direction towards the upper surface of the cutting insert, an axially downward direction towards the lower surface of the cutting insert, a radially outward direction towards the exterior sidewall of the cutting insert, a radially inward direction towards the central axis of the cutting insert, and a circumferential direction extending circumferentially about the central axis,
wherein the lower interior sidewall portion includes a plurality of circumferentially offset and radially inwardly raised portions and a plurality of circumferentially offset and radially outwardly recessed portions, each recessed portion of the plurality of circumferentially offset and radially outwardly recessed portions being defined by a radially outwardly recessed interior surface between adjacent raised portions of the plurality of circumferentially offset and radially inwardly raised portions,
wherein, in a vertical cross-section of the cutting insert along the central axis thereof, a distance between the upper interior sidewall portion and the central axis decreases with respect to the axially downward direction of the cutting insert and a distance between the radially outwardly recessed interior surfaces and the central axis increases with respect to the axially downward direction of the cutting insert,
wherein, in a bottom view of the cutting insert, all of the radially outwardly recessed interior surfaces of the plurality of circumferentially offset and radially outwardly recessed portions are visible; and
a screw having a shaft extending through the hole of the cutting insert and screwed into the threaded bore of the toolholder,
wherein the shaft of the screw is configured to elastically deform in the radially outward direction to frictionally engage with a radially outwardly recessed interior surface of the plurality of circumferentially offset and radially outwardly recessed portions to inhibit rotation of the cutting insert.

9. The cutting tool of claim 8, wherein the toolholder includes a toolholder pocket having a toolholder floor, and wherein a shape of the lower surface of the cutting insert is substantially the same as a shape of the toolholder floor.

10. The cutting tool of claim 8, wherein the toolholder includes a toolholder pocket having a pocket sidewall, and wherein a shape of the exterior sidewall of the cutting insert is substantially the same as a shape of the pocket sidewall.

11. The cutting tool of claim 8, wherein the screw has a head, and wherein shape of the head is substantially the same as a shape of the upper interior sidewall portion.

12. The cutting tool of claim 8, wherein the interior sidewall includes a sidewall guide portion, wherein a radius defined by the sidewall guide portion corresponds to a radius of the shaft of the screw such that the radius defined by the sidewall guide portion is between 100% to 150% of the radius of the shaft of the screw.

13. A method for operating a cutting tool, the method comprising:
inserting a shaft of a screw through a hole of a cutting insert, the cutting insert comprising: an upper surface having a circular cutting edge; a lower surface opposite the upper surface; an exterior sidewall between the upper surface and the lower surface; and an interior sidewall defining a hole extending from the upper surface to the lower surface, wherein the interior sidewall includes an upper interior sidewall portion and a lower interior sidewall portion, the cutting insert having a central axis defining an axially upward direction towards the upper surface of the cutting insert, an axially downward direction towards the lower surface of the cutting insert, a radially outward direction towards the exterior sidewall of the cutting insert, a radially inward direction towards the central axis of the cutting insert, and a circumferential direction extending circumferentially about the central axis, wherein the lower interior sidewall portion includes a plurality of circumferentially offset and radially inwardly raised portions and a plurality of circumferentially offset and radially outwardly recessed portions, each recessed portion of the plurality of circumferentially offset and radially inwardly raised portions being defined by a radially outwardly recessed interior surface between adjacent raised portions of the plurality of circumferentially offset and radially inwardly raised portions;
screwing the shaft into a threaded bore of a toolholder;
during a first cutting load applied to the cutting insert during a cutting process, frictionally engaging a head of the screw with the upper interior sidewall portion of the cutting insert to inhibit a rotation of the cutting insert; and
during a second cutting load applied to the cutting insert during a cutting process, wherein the second cutting load is greater than the first cutting load, elastically deforming the shaft radially outwardly to frictionally engage with a radially outwardly recessed portion of the plurality of circumferentially offset and radially outwardly recessed portions to inhibit rotation of the cutting insert.

14. The cutting insert of claim 1, wherein, in a bottom view of the cutting insert, all of the radially outwardly interior surfaces of the plurality of circumferentially offset and radially outwardly recessed portions are visible.

15. The cutting tool of claim 8, wherein the upper interior sidewall portion and a head of the screw have a spherical shape.

* * * * *